United States Patent [19]
White

[11] Patent Number: 5,958,073
[45] Date of Patent: Sep. 28, 1999

[54] RELIABILITY ENHANCED PROCESSING SYSTEM AND METHOD FOR OPTIMIZING

[75] Inventor: Peter Duncan White, Tempe, Ariz.

[73] Assignee: Motorola, Inc., Schaumburg, Ill.

[21] Appl. No.: 08/866,609

[22] Filed: May 30, 1997

[51] Int. Cl.$^6$ .................................................. G06F 11/00
[52] U.S. Cl. ...................................... 714/37; 395/500.23
[58] Field of Search .............................. 395/183.13, 180, 395/182.02, 182.04, 182.06, 182.09, 183.17, 183.19, 184.01, 500.03, 500.05, 500.23; 380/21, 29, 49, 50, 25; 364/579, 737; 371/43.5, 36; 714/37, 1, 3, 15, 26

[56] References Cited

U.S. PATENT DOCUMENTS

| | | | |
|---|---|---|---|
| 4,870,575 | 9/1989 | Rutenberg | 364/300 |
| 5,081,678 | 1/1992 | Kaufman et al. | 380/21 |
| 5,235,642 | 8/1993 | Wobber et al. | 380/25 |
| 5,301,247 | 4/1994 | Rasmussen et al. | 380/43 |
| 5,357,452 | 10/1994 | Pio-di-Savoia et al. | 364/579 |
| 5,455,862 | 10/1995 | Hoskinson | 380/21 |
| 5,457,704 | 10/1995 | Hoeher et al. | 371/43 |
| 5,499,295 | 3/1996 | Cooper | 380/23 |
| 5,724,425 | 3/1998 | Chang et al. | 380/25 |
| 5,748,873 | 5/1998 | Ohguro et al. | 395/182.09 |
| 5,796,950 | 8/1998 | Sips et al. | 395/200.48 |

OTHER PUBLICATIONS

An article entitled "Design and Verification of Secure Systems", by J.M.Rushby from 1981 ACM 0–89791–062–1–12/81–0012.

An article entitled "Toward Formal Development Of Programs From Algebraic Specifications: Implementations Revisited", by Donald Sannella and Andrzej Tarlecki from Acta Informatica, (1988).

An article entitled "Algorithm Theories And Design Tactics", by Douglas R. Smith and Michael R. Lowry from Science Of Computer Programming 14 (1990) 305–321 North–Holland.

An article entitled "A Semantic Race Detection Tool For PVM" by Suresh K. D. Samordaran–Kamal and Joan M. Francioni, from Aug. 1994 IEEE.

An article entitled "The Role Of Formal Methods In Achieving Dependable Software", by Martyn Thomas, from Reliability Engineering and System Safety, 1994 Elsevier Science Limited, England.

An article entitled "Using Formal Methods In A Design For Reliability As Applied To An Electronic System That Integrates Software And Hardware To Perform A Function", by B.A.L. Gwandu and D.J. Creasey from Microelectron. Reliab., vol. 35 No. 8, pp. 1111–1124, 1995. Elsevier Science Ltd. Printed in Great Britian.

*Primary Examiner*—Robert W. Beausoliel, Jr.
*Assistant Examiner*—Nadeem Iqbal
*Attorney, Agent, or Firm*—Gregory J. Gorrie; Frank J. Bogacz

[57] ABSTRACT

An architecture model (10) provides a model of a data processing system. Pre-condition checks (51–52) and post-condition checks (71–72) are added to the architecture model (10) produce a reliability enhanced architecture model (50) to detect faults achieving a desired fault grade. Applying optimization techniques to the conditional checks of the reliability enhanced architecture model (50) reduces the complexity of implementing the model while maintaining or increasing the overall fault grade. The implementation of the reliability enhanced architecture model (50) when hosted on a separation architecture ensures the fault grade specified for the model.

16 Claims, 3 Drawing Sheets

RELIABILITY ENHANCED PROCESSING SYSTEM AND METHOD FOR OPTIMIZING

FIELD OF THE INVENTION

This invention relates in general to the field of hardware and software processing systems, in particular to high assurance hardware and software processing systems and more particularly to fail safe hardware and software high assurance systems having a specified fault grade.

BACKGROUND OF THE INVENTION

High assurance processing systems having safety and security requirements are commonly required in many commercial and military applications. In existing technology, high assurance systems specifying "fail safe" design constraints are often implemented using techniques of physical redundancy. While effective, physically replicating complex system elements is often times expensive in terms of hardware, complexity, power, and cost. A problem is providing the improved reliability benefits of physical redundancy while not requiring physical replication of complex system elements.

Because of non-separable system element interdependencies, a high assurance system is often evaluated as a group of non-separable system elements. It is a problem to determine the number of detectable faults (i.e., fault grade) for a high assurance system, when considering the system as a whole and not as a collection of freely separable elements where each element has only known effects on other elements. System elements may have individual fault grade ratings but when considered as part of an entire system, the fault grade does not account for interdependent system elements. Therefore, among other things, system behavior is effected by system elements and interdependencies of system elements. Design approaches where verification elements are added to check each system element inputs and outputs further reduces the system assurance because new interdependencies introduced for each newly added verification element. Interdependency of system elements causes a problem with considering separate system elements in high assurance analysis and testing. Unclear or unknown system element interdependencies also make it impractical or impossible to determine fault grades for processing paths where critical system functions are performed. High assurance evaluation techniques requiring complicated analysis or extensive system and element testing are subject to error when interdependencies are overlooked, not understood, and eliminated to simplify analysis and test complexity. Given the difficulty of understanding system element interdependencies, and the complexity when analyzing and testing high assurance systems, it would be desirable to have a method to specify and verify fault grade and separation of system elements using high assurance evaluation techniques. Furthermore, in cases where analysis of a high assurance design modeling is deterministic, the design implementation and hosting the design implementation in the target environment present a problem when attempting to preserve high assurance design constraints specified during design modeling. So, it is also desirable to specify and verify high assurance design constraints and separation of a system and its elements in phases of development.

Thus, what is needed is a processing system having high assurance characteristics. What has also needed is a method of processing data having fail safe assurances. Also needed is a method of optimizing a processing system having reliability enhanced processing characteristics.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a processing system having high assurance characteristics. What is also provided is a method of processing data having fail safe assurances. Also provided is a method of optimizing a processing system having reliability enhanced processing characteristics.

Figure 1:
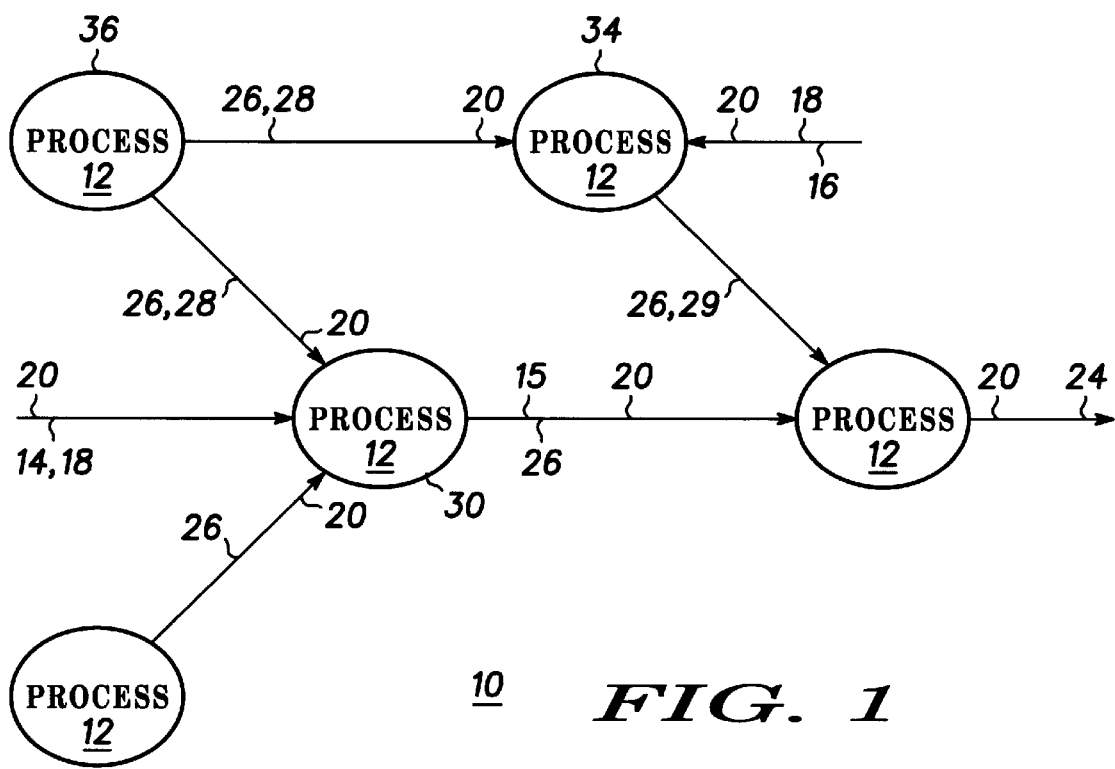
FIG. 1 shows a graphical representation of an architecture model in accordance with a preferred embodiment of the present invention.

FIG. 1 shows a graphical representation of architecture model 10 in accordance with a preferred embodiment of the present invention. In the preferred embodiment, architecture model 10 represents a data processing system which accepts system input data 18, performs processing on that data via processes 12, and produces system output data 24. The data processing system may be implemented in either hardware or software or a combination thereof. While symbolic representation of architecture model 10 may vary between different design methodologies, architecture model 10 could represent, but is not limited to, functional decomposition and data and control flow diagrams. In one embodiment where architecture model 10 is a software architecture, architecture model 10 may also represent object-oriented modeling approaches to software design.

Processes 12 represent the architecture elements which accept system input data 18 and inter-process data 26. Processes 12 perform processing steps on system input data 18 and inter-process data 26 then output inter-process data 26 and system output data 24. Additionally, processes 12 may model the storage of all or part of system input data 18, inter-process data 26, data created internal to processes 12, and system output data 24.

System input data 18 represents data which are input to architecture model 10 and are processed by processes 12. In the preferred embodiment, architecture model 10 represents a cryptographic system and system input data 18 is (unencrypted) plaintext message data 14 which is processed by message encryption process 30 into (encrypted) cyphertext message data 15. In this embodiment, encryption key 16 is used by key encryption process 34 for encrypting message encryption key 28.

Inter-process data 26 are data flowing from one process 12 to another process 12. Processes 12 process inter-process data 26 in a manner similar to processing of system input data 18. For example, in one embodiment architecture model 10 represents a cryptographic system where message key creation process 36 creates inter-process message encryption key 28 used by message encryption process 30 to encrypt plaintext message data 14. Message encryption process 30 preferably accepts system input plaintext message data 14 which is data to be encrypted. Therefore, message encryption process 30 may accept both system input data 18 and inter-process data 26 and performs processing steps called operations on the data. More generally, system input data 18 and inter-process data 26 are data which are processed and preferably stored by processes 12.

Flow arrows 20 show the flow and communication of data through architecture model 10. Although communication direction of system input data 18, inter-process data 26, and system output data 24 is suggested by flow arrows 20, flow arrows 20 do not necessarily indicate any directional information.

Figure 2:
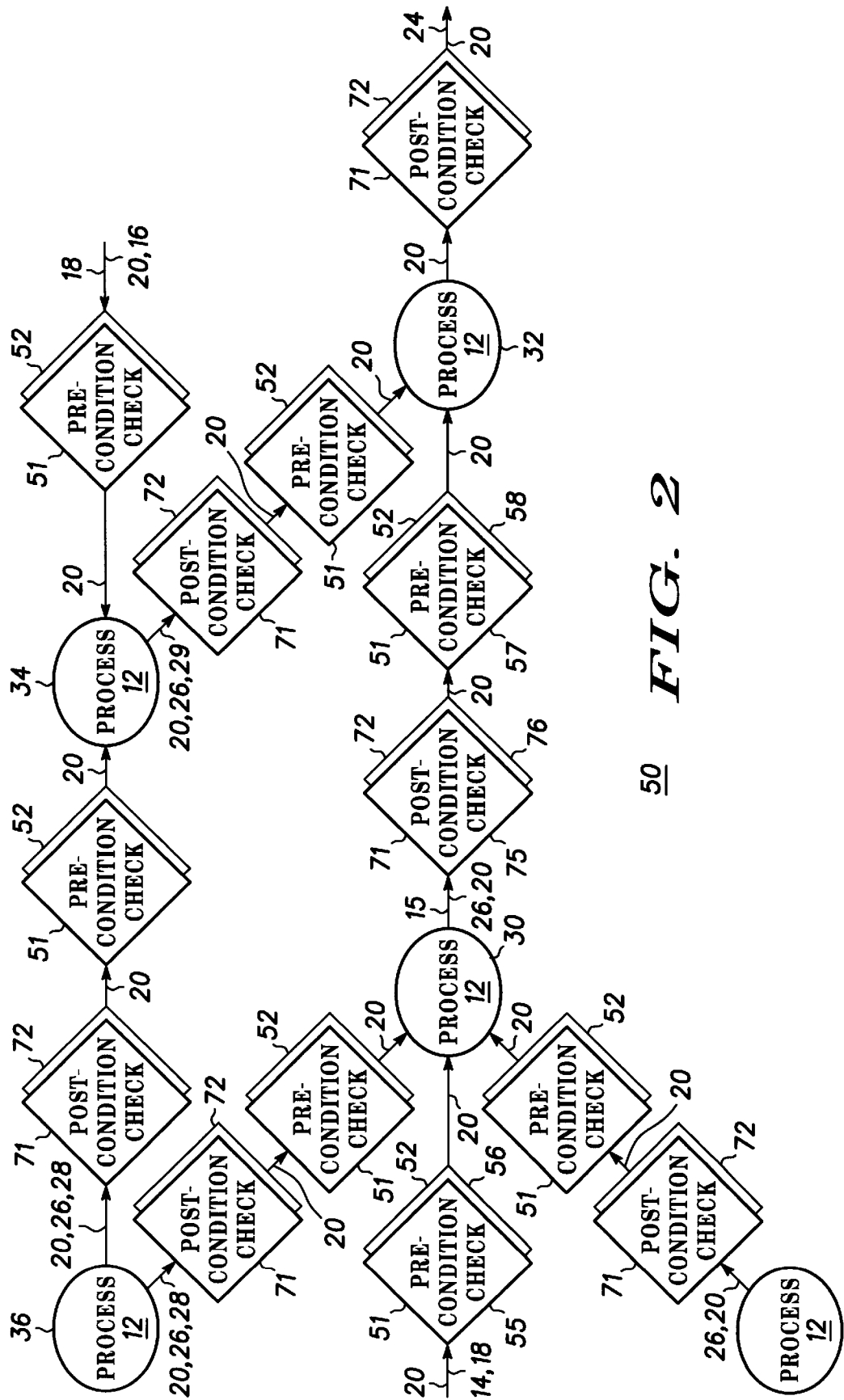
FIG. 2 shows a reliability enhanced architecture model in accordance with a preferred embodiment of the present invention.

FIG. 2 shows a reliability enhanced architecture model in accordance with a preferred embodiment of the present invention. Reliability enhanced architecture model is herein referred to as "reliability model". Reliability model 50 is a modified version of architecture model 10 (FIG. 1). Reliability model 50 among other things, adds two new elements to architecture model 10 for each process 12. The two new elements are pre-condition checks 51 and post-condition checks 71. Preferably there is a multiplicity of condition checks, the number determined by the fault grade. Condition checks 52 and 72 represent the multiplicity. Fault grade of a reliability enhanced architecture model is discussed below.

Pre-condition checks 51 and 52 model data verification of design constraints on input data for each process 12. The data verification action of each pre-condition check is preferably "implementation independent" of every other pre-condition check. In the preferred embodiment, an example of implementation independent pre-condition checks is preferably having different developers or development teams using similar design and implementation methodologies but performing their work without sharing design and implementation assumptions and approaches. In the preferred embodiment of the present invention, an application example of the implementation independent pre-condition checks is the representation of a message encryption system by reliability model 50. Plaintext message data 14 is processed by message encryption process 30 into cyphertext message data 15. Pre-condition check 55 may compute an even parity checksum of plaintext message data 14. Pre-condition check 56 may compute another even parity checksum of plaintext message data 14 using a method which is implementation independent of that used by pre-condition check 55. As a data integrity verification, checksum results from pre-condition checks 55 and 56 are preferably compared by message encryption process 30 to validate or invalidate plaintext message data 14. Since the design and implementation of each pre-condition check associated with the same process is preferably performed implementation independent from every other pre-condition check, each pre-condition check (e.g. 51 and 52) connected by flow arrows 20 to processes 12 verifies design constraints independent of other pre-condition checks.

Post-condition checks 71 and 72 represent data verification checks of design constraints on output data for each process 12. The data verification action of each post-condition check is preferably implementation independent of every other post-condition check. In the preferred embodiment, the implementation independent post-condition checks may be implemented by different developers or development teams using similar design and implementation methodologies but performing their work without sharing design and implementation assumptions and approaches. In the preferred embodiment of the present invention, an application example of the implementation independent post-condition checks is when reliability model 50 represents a message encryption system. Post-condition check 75 computes an even parity checksum of the cyphertext message data 15. In this embodiment, post-condition check 76 computes another even parity checksum of cyphertext message data 15 using a method which is implementation independent of that used by post-condition check 75. As a data integrity verification, checksum results from post-condition checks 75 and 76 are preferably compared by digital signature process 32 to validate or invalidate cyphertext message data 15. Since the design and implementation of each post-condition check associated with the same process is preferably performed as implementation independent from every other post-condition check, each post-condition check (e.g. 71 and 72) connected by flow arrows 20 to processes 12 verifies design constraints independent other post-condition checks.

Fault grade is a system specification of fault tolerance. Fault grade is commonly referred to as a number of faults a system detects when verifying data processed by the system. The fault grade of reliability model 50 represents the number of faults reliability model 50 detects when verifying data processed by the model. A pre-determined fault grade is implemented by adding a plurality of independent pre-condition and post-condition checks. The number of pre-condition and post-condition checks is preferably one more than the desired fault grade. The fault grade of a reliability model may be changed by changing the multiplicity of independent pre-condition checks and post-condition checks associated with each process. The fault grade for reliability model 50 represents the number of faults the model detects before producing system output data 24. For example, assuming separation of processes 12 with no unwanted process, conditionals, or flow arrow interaction, reliability model 50 has a fault grade of one. The fault grade is shown symbolically by the multiplicity of two pre-condition checks, 51 and 52, and two post-condition checks, 71 and 72, for each process 12. Since the multiplicity of the pre-condition checks 51 and 52 and post-condition checks 71 and 72 is one greater than the specified fault grade of one, the fault grade is achieved.

When a hardware or software model has elements performing checks to validate design constraints of the model, the model design process is a Fail Safe Design Assurance (FSDA) process. For example, in the preferred embodiment, reliability model 50 represents a cryptographic system which may specify no system output data 24 when a conditional check fails to validate design constraints. Since no system output data 24 is produced under these failure conditions, reliability model 50 is said to "fail safely".

Figure 3:
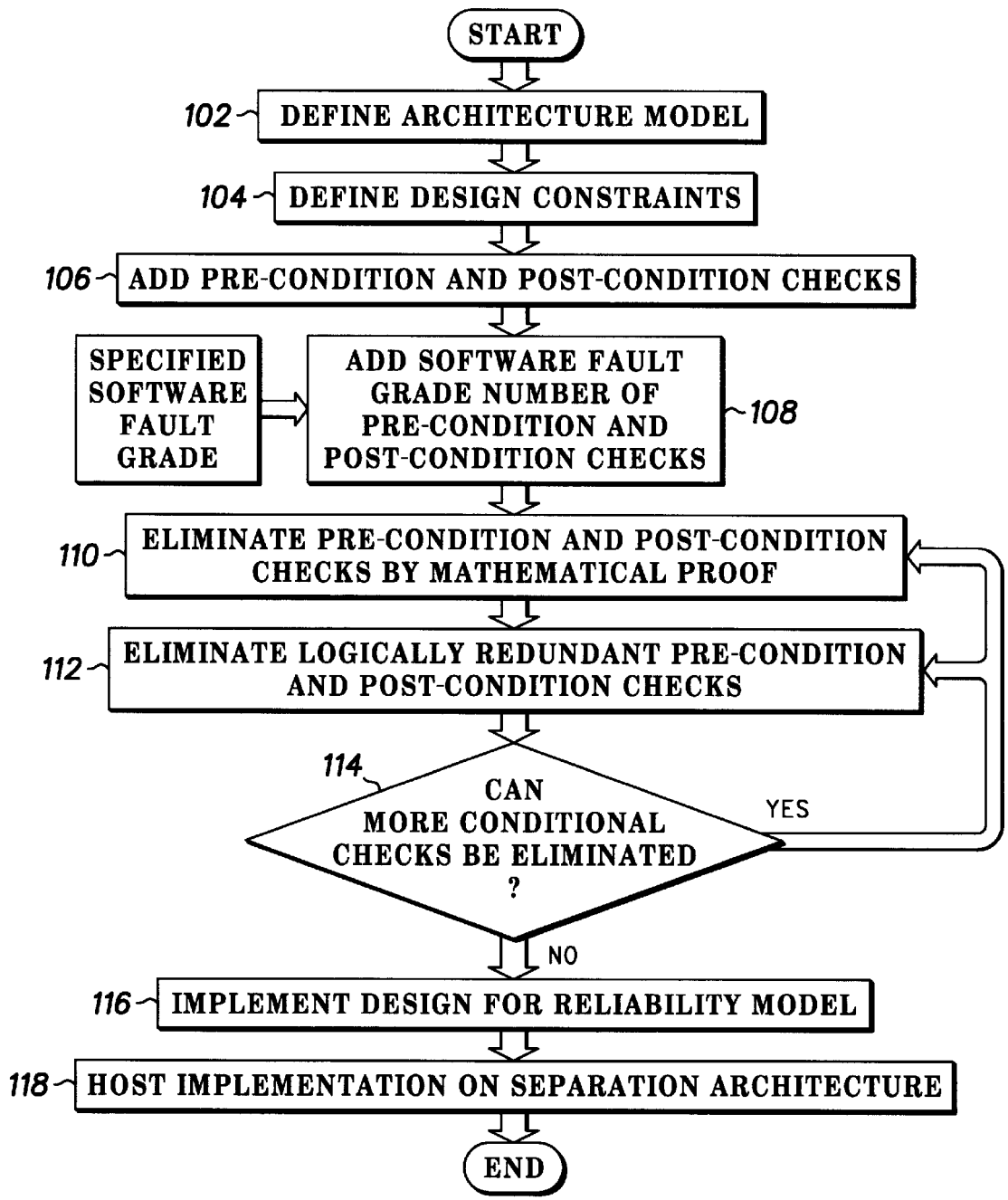
FIG. 3 illustrates a flow chart of a reliability enhancement procedure in accordance with a preferred embodiment of the present invention.

FIG. 3 illustrates a flow chart of a reliability enhancement procedure in accordance with a preferred embodiment of the present invention. Procedure 100 is preferably performed by designers during the design process of a data processing system, however portions may be performed by a design tool, running on a computer.

In task 102, an architecture model is defined. The model is designed to meet requirements of a system, such as a data processing system. Creating and defining requirements for a system are outside the scope of this invention. Defining an architecture model which implements the requirements is discussed in literature on hardware and software design however, a few brief design concepts are outlined here. Defining an architecture model, as shown in architecture model 10 (FIG. 1), includes grouping sets of related processing steps, commonly called operations, to individual processes 12. Processes 12 which communicate with each other and outside architecture model 10 are connected by flow arrows 20. Again referencing FIG. 1 for example purposes, in the preferred embodiment, architecture model 10 represents a cryptographic message encryption system. Digital signature process 32 may perform a hash operation on input data including cyphertext message data 15 and encrypted message encryption key 29. Digital signature process 32 signs the hash values created by the hash operation discussed above. This example shows a preferred embodiment where groups of related operations, namely hashing and signing data, are allocated to a process thereby partially defining the architecture. Other steps in defining an architecture model include, but are not limited to, specifying process communication paths as shown by flow arrows 20 and specifying data stored by processes.

In task 104, the design constraints of input and output data for each process are defined. The design constraints on each process input data are preferably modeled as pre-condition checks in a later task. The design constraints on each process output data are preferably modeled as post-condition checks in a later task.

In task 106, a pre-condition and post-condition check are added preferably for each process. The architecture model defined in task 102 and further specified in task 104 is modified by adding a single pre-condition check before each process and a single post-condition after each process. An example of performing this task on architecture model 10 (FIG. 1) would be reliability model 50 (FIG. 2) with one pre-condition and post-condition check for each process 12.

Task 108 adds a number of pre-condition and post-condition checks to the reliability model for each process 12. Task 108 is performed on the reliability model created in task 106. When performing task 108, the overall multiplicity of pre-condition and post-condition checks is preferably set at one greater than the fault grade desired for the reliability model. In other words, if the reliability model is to detect the occurrence of some number of faults in the original architecture model specified in task 102, then the multiplicity of pre-condition and post-condition checks is preferably set at one greater than the number of faults to be detected. Similarly, any specified fault grade is preferably achieved by adding one to the architecture's desired fault grade and adding that multiplicity of pre-condition and post-condition checks to each process in the architecture model.

In task 110, selected pre-condition and post-condition checks are eliminated by mathematical proof. Applying task 110 to reliability model 50 (FIG. 2) is an optimization step of reducing the multiplicity of selected sets of pre-condition checks and post-condition checks while at least maintaining or preferably increasing the fault grade. Techniques of mathematical analysis and correctness by construction may be used to show that a single instance of a pre-condition or post-condition check, meets a certain fault detection level when the check has been shown mathematically to verify specified design constraints. The reliability advantages provided by multiple pre-condition or post-condition checks added in task 108 may not be needed for fault detection if a conditional check associated with a process or the process itself is mathematically shown to be correct. Given a conditional check mathematically shown to be correct, the overall fault grade is at least maintained or increased while reducing the multiplicity of conditional checks. In order to identify pre-condition checks and post-condition checks as candidates for proving mathematically, the design constraints specified in task 104 are evaluated to determine difficulty in proving mathematical correctness. As an example of this task, consider the preferred embodiment where reliability model 50 (FIG. 2) represents a cryptographic system of plaintext message encryption. Pre-condition checks 55 and 56 may need only perform simple but independent checksum operations of plaintext message data 14. These checksum operations are candidates for proving mathematical correctness. Because these operations have a low degree of complexity, this set of pre-condition checks may be identified as candidates for proving correctness mathematically. Because of the mathematical proof of the operation, a single pre-condition check, perhaps pre-condition check 55, shows fault detection of invalid plaintext message data 14 to message encryption process 30. Therefore, the fault grade at pre-condition check 55 would evaluate to infinity and verify plaintext message data 14 is correct if delivered to message encryption process 30. Accordingly, pre-condition check 56 would no longer be necessary to maintain the overall fault grade for reliability model 50. Therefore, the affect of reducing the multiplicity of any set of pre-condition or post-condition checks using mathematical proof of correctness is that the fault grade specified in task 108 is at least maintained or possibly increased.

In task 112, logically redundant pre-condition and post-condition checks are eliminated. Logically redundant pre-condition and post-condition checks are best discussed as an example. Consider again the example of the cryptographic system of the preferred embodiment in reliability model 50 (FIG. 2) where post-condition checks 75 and 76 immediately precede pre-condition checks 57 and 58. The post-condition checks 75 and 76 verify the data output from message encryption process 30. Pre-condition checks 57 and 58 verify data input to digital signature process 32. This output data verified by post-condition checks 75 and 76 is the same input data verified by pre-condition checks 57 and 58. Therefore, the post-condition checks in 75 and 76 and pre-condition checks 57 and 58 are a logically redundant check. Therefore, one set of logically redundant checks, say post-condition checks 75 and 76, may be eliminated. Similar logical redundancies commonly exist in reliability enhanced architecture represents and should be eliminated wherever possible.

In task 114, the reliability model is examined for other pre-condition and post-condition checks which may be eliminated. If another set of pre-condition or post-condition checks are candidates to be proven mathematically, a switch back to task 110 is performed. If another logical redundancy exists in the reliability model, a switch back to task 112 is performed. When the designer determines no other pre-condition or post-condition checks may be eliminated from the reliability model, task 116 is performed.

In task 116, a design is implemented for the optimized reliability model. The design may be implemented in hardware and software. If the design is implemented in software, source code for pre-condition checks, post-condition checks, and processes is implemented in task 116. When pre-condition checks and post-condition checks are shown to be mathematically correct, source code is preferably generated using commercially available software tools. When pre-condition and post-condition checks are not shown to be mathematically correct, implementation independent source code development is preferable for each instance of each conditional. If processes are not shown to be mathematically correct, source code implementation method is preferably selected by the software designer.

If a hardware implementation is chosen, hardware design for pre-condition checks, post-condition checks, and processes are implemented in this task. When pre-condition checks and post-condition checks are shown to be mathematically correct, hardware design is preferably generated using commercially available tools. When pre-condition and post-condition checks are not shown to be mathematically correct, implementation independent hardware development is preferable for each instance of each conditional. If processes are not shown to be mathematically correct, the hardware implementation method is preferably selected by the hardware designer.

The processes and condition checks may alternatively be implemented in a combination of hardware and software.

In task 118, host the reliability model implementation on a separation architecture. A separation architecture, among other things, provides the implementation performed in task 116 an environment with perfect separation of processes, conditional checks, and flow arrows (communications). Separation of processes, conditional checks, and flow arrows (communications) helps assure that the fault grade is maintained. Furthermore, the separation architecture provides that interaction in the implementation of the reliability model between processes, conditional checks, and flow arrows exists where specified in reliability model. There is preferably no interaction between processes, conditional checks, and flow arrows when not specified in the reliability model when implemented in a separation architecture. Applying procedure 100 to design, implement, and host a system provides Fail Safe Design Assurance (FSDA) with a specified fault grade.

Thus, what has been shown is a processing system having high assurance characteristics. What has also been shown is a method of processing data having fail safe assurances. Also shown is a method of optimizing a processing system having reliability enhanced processing characteristics.

Thus, a high assurance processing system and methods of processing data having fail safe assurances and optimizing a processing system has been described which overcomes specific problems and accomplishes certain advantages relative to prior methods and mechanisms. The improvements over known technology are significant. The uncertainties, complexities, and expense of analyzing and testing a high assurance system are avoided.

In summary, the present invention provides, a processing system for processing system input data and providing system output data. The processing system includes a plurality of separated processes, each process accepting process input data and providing process output data. The processing system also includes condition checks associated with each of the processes, each condition check for verifying that the process input data or the process output data meets a criteria defined for the associated process. The condition checks do not include logically redundant and mathematically demonstrated redundant condition checks. In a preferred embodiment, the separated processes and the condition checks are implemented in a separation architecture. The separation architecture has isolation between each of the process, and has isolation between each of the condition checks.

In another preferred embodiment, the processing system has a predetermined fault grade, and further comprises a number of condition checks for each of the processes, each condition check is independent of other of the condition checks, the number being greater than the predetermined fault grade. In another preferred embodiment, the separation architecture is a software architecture. In another preferred embodiment, the separation architecture is a hardware architecture.

The present invention also provides a method of enhancing reliability of a processing system. The processing system is comprised of a plurality of processes. Each process accepts input data and provides output data. The method comprises the step of adding, for each of the separated processes, a pre-condition check, each pre-condition check verifying that the input data meets an input criteria for the associated process. The method also includes the step of adding for each of the separated processes, a post-condition check each post-condition check verifying that the output data meets an output criteria for the associated process. The method also comprises the steps of eliminating logically redundant ones of the pre and post-condition checks, and eliminating mathematically demonstrated redundant ones of the pre and post-condition checks, and implementing the separated processes and remaining ones of the pre and post-condition checks in an architecture having separation between each of the processes.

In a preferred embodiment, the architecture has a predetermined fault grade, and the adding steps further comprise the steps of adding a number of pre-condition checks for each of the separated processes, each pre-condition check being independent of other of the pre-condition checks, the number being greater than the fault grade and adding the number of post-condition checks for each of the separated processes, each post-condition check being independent of other of the post-condition checks.

In another preferred embodiment, the separated processes and remaining ones of the pre and post-condition checks are implemented in a software architecture providing separation between each of the processes. In another preferred embodiment, the separated processes and remaining ones of the pre and post-condition checks are implemented in a hardware architecture providing separation between each of the processes.

The present invention also provides a processing system for processing system input data and providing system output data. The processing system is comprised of a plurality of separated processes, each separated process accepts process input data and providing process output data. The processing system also includes independent pre-condition checks associated with each of the separated processes, each independent pre-condition check for verifying that the process input data meets an input criteria defined for the associated process. The processing system also includes independent post-condition checks associated with each of the separated processes, each independent post-condition check for verifying that the process output data meets an output criteria defined for the associated separated process. The independent pre-condition checks and independent post-condition checks do not including logically redundant and mathematically demonstrated redundant checks.

In a preferred embodiment, the separated processes and the independent pre-condition and post-condition checks are implemented in a separation architecture. The separation architecture has isolation between each of the separated process, and has isolation between each of the independent pre-condition checks, and each of the independent post-condition checks.

The present invention also provides method of processing data in a processing system. The method comprises the steps of processing process input data and providing process output data in plurality of separated processes, and verifying the process input data meet an input criteria for the associated process, the verifying the process input data step performing independent pre-condition checks for each of the processes. The method also includes the step of verifying the process output data meet an output criteria for the associated separated process, the verifying the process output data step performing independent pre-condition checks for each of the separated processes. The independent pre-condition checks and the independent post-condition checks do not including logically redundant and mathematically demonstrated redundant checks.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A processing system for processing system input data and providing system output data, the processing system comprised of:

a plurality of separated processes, each process accepting process input data and providing process output data;

condition checks associated with each of the processes, each condition check for verifying that the process input data or the process output data meets a criteria defined for the associated process, the condition checks not including logically redundant and mathematically demonstrated redundant condition checks; and the separated processes and the condition checks are implemented in a separation architecture, the separation architecture having isolation between each of the process, and having isolation between each of the condition checks.

2. A processing system as claimed in claim 1 wherein the processing system has a predetermined fault grade, and wherein the processing system further comprises:

a number of condition checks for each of the processes, each condition check being independent of other of the condition checks, the number being greater than the predetermined fault grade.

3. A processing system as claimed in claim 2 wherein the separation architecture is a software architecture.

4. A processing system as claimed in claim 2 wherein the separation architecture is a hardware architecture.

5. A method of enhancing reliability of a processing system comprised of a plurality of processes, each process accepting input data and providing output data, the method comprising the steps of:

adding, for each of the separated processes, a pre-condition check, each pre-condition check verifying that the input data meets an input criteria for the associated process;

adding for each of the separated processes, a post-condition check each post-condition check verifying that the output data meets an output criteria for the associated process;

eliminating logically redundant ones of the pre and post-condition checks;

eliminating mathematically demonstrated redundant ones of the pre and post-condition checks; and implementing the separated processes and remaining ones of the pre and post-condition checks in an architecture having separation between each of the processes, pre-condition checks and post-condition checks.

6. A method as claimed in claim 5 wherein the architecture has a predetermined fault grade, and wherein the adding steps further comprising the steps of:

adding a number of pre-condition checks for each of the separated processes, each pre-condition check being independent of other of the pre-condition checks, the number being greater than the fault grade; and adding the number of post-condition checks for each of the separated processes, each post-condition check being independent of other of the post-condition checks.

7. A method as claimed in claim 6 wherein the implementing step includes the step of implementing the separated processes and remaining ones of the pre and post-condition checks in a software architecture providing separation between each of the processes.

8. A method as claimed in claim 6 wherein the implementing step includes the step of implementing the separated processes and remaining ones of the pre and post-condition checks in a hardware architecture providing separation between each of the processes.

9. A processing system for processing system input data and providing system output data, the system comprised of:

a plurality of separated processes, each separated process accepting process input data and providing process output data;

independent pre-condition checks associated with each of the separated processes, each independent pre-condition check for verifying that the process input data meets an input criteria defined for the associated process;

independent post-condition checks associated with each of the separated processes, each independent post-condition check for verifying that the process output data meets an output criteria defined for the associated separated process, the independent pre-condition checks and independent post-condition checks not including logically redundant and mathematically demonstrated redundant checks; and the separated processes and the independent pre-condition and post-condition checks are implemented in a separation architecture, the separation architecture having isolation between each of the separated process, and having isolation between each of the independent pre-condition checks, and each of the independent post-condition checks.

10. A processing system as claimed in claim 9 wherein the processing system has a predetermined fault grade, and wherein the processing system further comprises:

a first number of pre-condition checks for each of the processes, each pre-condition check being independent of other of the pre-condition checks, the first number being greater than the fault grade; and a second number of post-condition checks for each of the processes, each post-condition check being independent of other of the post-condition checks, the second number being greater than the fault grade.

11. A processing system as claimed in claim 10 wherein the separation architecture is a software architecture providing separation between the separated processes.

12. A processing system as claimed in claim 10 wherein the separation architecture is a hardware architecture providing separation between the separated processes.

13. A method of processing data in a processing system, the method comprising the steps of:

processing process input data and providing process output data in plurality of separated processes;

verifying the process input data meet an input criteria for the associated process, the verifying the process input data step performing independent pre-condition checks for each of the processes; and verifying the process output data meet an output criteria for the associated separated process, the verifying the process output data step performing independent pre-condition checks for each of the separated processes, wherein the independent pre-condition checks and the independent post-condition checks do not including logically redundant and mathematically demonstrated redundant checks;

the steps of the system accepting system input data and providing system output data, the system input data being process input data for one of the separated processes, the system output data being process output data for another of the separated processes; and the processing step, and the verifying steps are performed in a separation architecture, the separation architecture having isolation between each of the separated process, and providing isolation between each of the independent pre-condition checks, and each of the independent post-condition checks.

14. A method as claimed in claim 13 wherein the processing system has a predetermined fault grade, and wherein:

the verifying the process input data step includes verifying the process input data by a first number of pre-condition checks for each of the processes, the first number being greater than the fault grade; and the verifying the process output data step includes verifying the process output data by a second number of post-condition checks for each of the separated processes, the second number being greater than the fault grade.

15. A method as claimed in claim 14 wherein the processing step, and the verifying steps are performed by a separation architecture, the separation architecture being a software architecture providing separation between the separated processes.

16. A method as claimed in claim 14 wherein the processing step, and the verifying steps are performed by a separation architecture, the separation architecture being a hardware architecture providing separation between the separated processes.

* * * * *